United States Patent [19]
Wilcox

[11] Patent Number: 4,895,484
[45] Date of Patent: Jan. 23, 1990

[54] FASTENER WITH FLOATING NUT FOR USE WITH COMPOSITE STRUCTURE

[75] Inventor: James G. Wilcox, Rancho Palos Verdes, Calif.

[73] Assignee: Deutsch Fastener Corp., Lakewood, Calif.

[21] Appl. No.: 262,423

[22] Filed: Oct. 25, 1988

[51] Int. Cl.$^4$ ............................................. F16B 27/00
[52] U.S. Cl. ........................................ 411/85; 411/82; 411/103; 411/427; 411/966
[58] Field of Search .................... 411/84, 85, 103, 105, 411/107, 108, 111, 112, 182, 427, 432, 113, 520, 82, 966, 104, 109, 970

[56] References Cited

U.S. PATENT DOCUMENTS

| | | |
|---|---|---|
| 2,243,923 | 6/1941 | Swanstrom ......................... 411/113 |
| 2,299,158 | 10/1942 | Luce ..................................... 411/84 |
| 2,815,789 | 12/1957 | Hutson et al. ..................... 411/111 |
| 2,820,499 | 1/1958 | Scharf ................................. 411/103 |
| 3,020,946 | 2/1962 | Mills .................................... 411/85 |
| 3,123,120 | 3/1964 | Grimm et al. ..................... 411/111 |
| 3,164,191 | 1/1965 | Grimm et al. ..................... 411/85 |
| 3,695,324 | 10/1972 | Gulistan ............................. 411/111 |
| 4,695,212 | 9/1987 | Berecz ................................. 411/85 |
| 4,730,967 | 3/1988 | Warkentin .......................... 411/103 |

FOREIGN PATENT DOCUMENTS

| | | |
|---|---|---|
| 729521 | 12/1942 | Fed. Rep. of Germany ...... 411/427 |
| 597569 | 1/1948 | United Kingdom ................ 411/427 |

Primary Examiner—Rodney M. Lindsey
Attorney, Agent, or Firm—Richard F. Carr; Allan Rothenberg; Richard L. Gausewitz

[57] ABSTRACT

A fastener unit for use on a composite nonmetallic surface which includes a channel of composite nonmetallic material, which may be bonded or riveted to the supporting surface, and has at least one opening through it, and a fastener assembly which includes a basket having an opening in its center and slotted deflectable end walls, a retainer member, including a flat portion with tabs projecting into openings in the side flanges of the channel and a tubular portion extending into the opening in the central web of the channel, and a nut having a base portion with tabs received in the openings in the end walls of the basket. Clearances are provided so that the nut has limited lateral floating movement. The nut is removable from the remainder of the unit by deflecting the end walls of the basket, which permits the nut to be replaced.

11 Claims, 1 Drawing Sheet

FASTENER WITH FLOATING NUT FOR USE WITH COMPOSITE STRUCTURE

BACKGROUND OF THE INVENTION

High performance aircraft now are being manufactured with extensive use of composite material made up of fibers of a material, such as graphite, embedded within a plastic. It becomes difficult to secure fasteners to this material because of its lower resistance to compression loads than metal, and such factors as notch sensitivity. The problem is made more severe for fasteners permanently attached to the aircraft structure with provision for limited floating movement to facilitate engagement by a mating threaded member. In many such cases a nut portion of the fastener may become damaged in service so that it should be removed from the assembly and replaced. Conventional fasteners are not suitable for this purpose when associated with composite aircraft structures.

SUMMARY OF THE INVENTION

This invention overcomes the difficulties of the prior art, providing a fastener unit which is compatible with composite materials. It is capable of holding a nut, with freedom for lateral floating movement, while allowing removal and replacement of the nut in the event of damage to that element. This is accomplished by a unit that includes a channel of composite material, which may be furnished in various lengths and can support several fastener assemblies at spaced locations. The channel usually is secured to a composite structure by adhesive, although riveting is possible if the user so desires.

The fastener assembly includes a basket member having a flat portion that overlies the central web of the channel and is provided with an opening through it that is positioned over an opening in the channel. The basket member is resilient and provided with deflectable end walls each of which has an opening. A retainer member includes a flat portion that fits over the central part of the basket member, and is provided with outwardly projecting tabs that fit within openings in the opposite sidewalls of the channel. The retainer member includes a tubular portion which is of stepped outer diameter, with a relatively large portion fitting closely within the opening in the basket member and the smaller end part within the opening in the central web of the channel. The end part of the tubular portion is of smaller diameter than the opening i the channel so that floating movement laterally is permitted to a limited degree. Above the retainer member is a nut which has a flat base portion with oppositely-projecting tabs which fit within the openings in the end walls of the basket member. This holds the nut to the basket member and the retainer, but clearance is provided to allow floating movement of the nut relative to the basket.

The walls of the channel, being of composite material, are not adapted for repeated flexing. They can be bent enough to allow the tabs of the retainer member to enter the openings in the sidewalls of the channel, but this, in effect, becomes a permanent connection because further flexing of the walls of the channel is undesirable. However, if the nut should become damaged, it may be removed from the unit by deflecting the end walls of the basket member so that the tabs of the nut can be removed from the openings in the end walls. Therefore, despite the fact that the fastener functions with a non-metallic structure and the nut can float laterally, the nut is fully removable for replacement, which is an important advantage because damage to the nut may occur in service.

Therefore, the fastener of this invention provides for a connection of fasteners to a composite surface, allowing limited floating movement of the fastener, yet, at the same time, permitting removal and replacement of the nut.

DETAILED DESCRIPTION OF THE INVENTION

Figure 1:
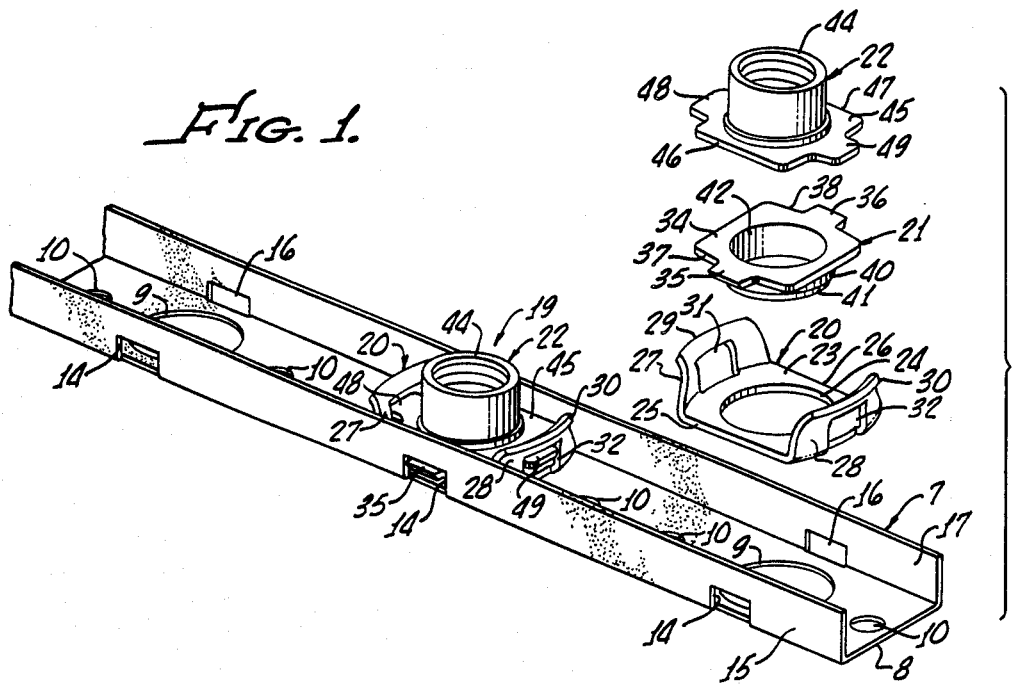
FIG. 1 is a perspective view, partially exploded, of the fastener unit of this invention.
Figure 2:
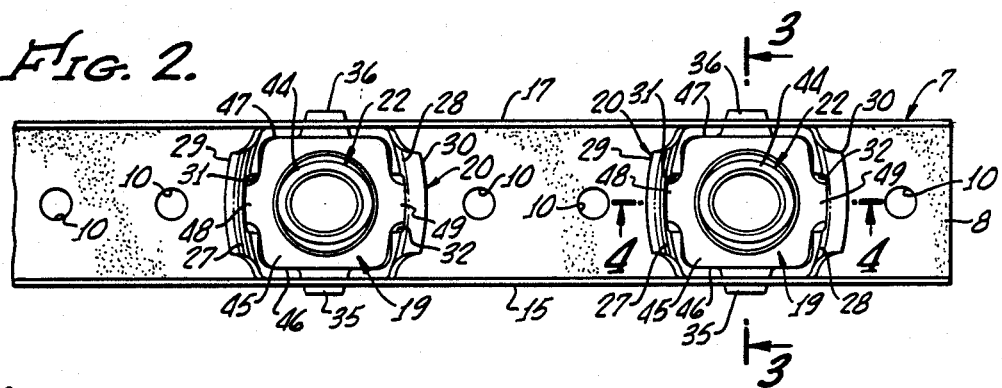
FIG. 2 is a top plan view of the fastener unit.
Figure 3:
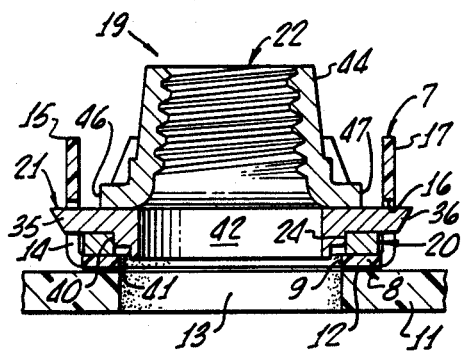
FIG. 3 is an enlarged transverse sectional view taken along line 3—3 of FIG. 2, showing also the attachment of the fastener unit to a supporting structure.
Figure 4:
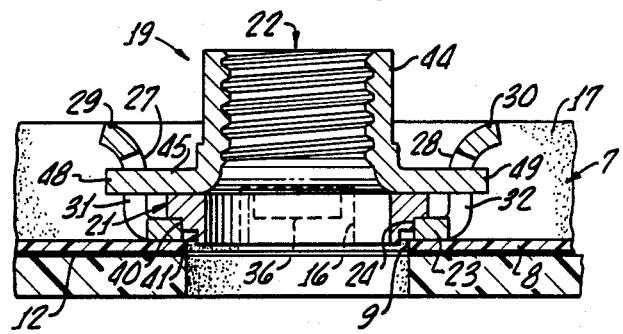
FIG. 4 is an enlarged longitudinal sectional view taken along line 4—4 of FIG. 2, with the fastener unit shown attached to a supporting structure.

The fastener assembly of this invention includes an elongated U-shaped channel 7, normally of composite material, such as a lamination that includes carbon fibers and is of the type currently used in high-performance aircraft. Provided in the central web 8 of the channel 7 are spaced, relatively large cylindrical openings 9. Intermediate each adjacent pair of the openings 9 are two spaced relatively small openings 10. Normally, the channel 7 is attached to a supporting surface by adhesive bonding. This is illustrated in FIGS. 3 and 4 where the channel is held to a supporting member 11 of composite material by means of an adhesive 12. An opening 13 in the supporting member 11 is aligned with the opening 9 in the channel 7. The openings 10 in the channel 7 permit an alternate attachment to the structure by means of rivets.

At the same location lengthwise of the channel 7 as each of the relatively large openings 9, there is a rectangular opening 14 in one side flange 15 of the channel 7 and a corresponding opening 16 in the other side flange 17 of the channel. Thus, the openings 14 and 16 are opposite from each other.

Fastener units 19 ar received within and carried by the channel 7. Each fastener unit is made up of three components, that is, a basket member 20, a retainer member 21 and a nut 22. The basket member 20 includes a central flat plate 23 with a relatively large opening 24 through the central part of this portion of the basket member. This opening is positioned above and is slightly larger than the opening 9 through the central web 8 of the channel 7. The central plate 23 of the basket member 20 includes parallel edges 25 and 26 along its opposite sides, and is slightly narrower than the spacing between the side flanges 15 and 17 of the channel 10. At the ends of the plate 23 are upstanding flanges 27 and 28. The flanges 27 and 28 may have some curvature, as viewed from above, being concave adjacent the opening 24. The upper edges 29 and 30 of the end flanges 27 and 28, respectively, are flared outwardly away from the central plate. Relatively large rectangular openings 31 and 32 are formed in the end flanges 27 and 28. These openings extend below the upper surface of the central plate 23 at their bottom edges, and their upper edges are beneath the outwardly flaring portions 29 and 30 of the end flanges. The basket member 20 is made of resilient material.

The retainer member 21 includes an upper flat part 34, which is generally rectangular, although its corners are rounded. Tabs 35 and 36 project laterally outwardly from the opposite side edges 37 and 38 of the flat upper part 34 of the retainer member 21. The spacing between the side edges 37 and 38 is less than the spacing between the side flanges 15 and 17 of the channel 10. Projecting from the bottom part of the retainer member at its center is a tubular element 40, the outer end part 41 of which is of reduced diameter along its outer surface. Consequently, the outer surface of the tubular element 40 has a stepped configuration. A central opening 42 in the upper flat part 34 of the retainer member 21 communicates with and provides a continuation of the opening through the tubular element 40.

The nut 22 includes threaded portion 44 at the base of which is a flat plate 45 which projects laterally outwardly. The opposite side edges 46 and 47 of the baseplate 45 are parallel and spaced apart a lesser distance than that between the side flanges 15 and 17 of the channel 7. Tabs 48 and 49 project outwardly from the opposite ends of the baseplate 45.

As assembled, the retainer member 21 is received within the basket member 20, with its flat portion 34 engaging the flat plate 23 of the basket. The tubular portion 40 extends downwardly into the opening 24 in the flat plate 23 of the basket member 20, making a close fit with the walls of this opening. The outer end of the reduced diameter part 41 of the tubular portion 40 extends to a position just below the bottom surface of the flat plate 23 of the basket 20.

The nut 22 also is received in the basket, with its baseplate 45 positioned over the flat portion 34 of the attachment member 21. The tabs 48 and 49 of the nut 22 are received in the openings 31 and 32, respectively, of the end flanges 27 and 28 of the basket. The tabs are smaller in width and thickness than the dimension of the opening. Also, the baseplate 45 of the nut 22 has a length less than the spacing between the end flanges 27 and 28 of the basket. This permits the nut 22 to float laterally relative to the basket 20 and relative to the attachment member 21. The tabs 48 and 49 can be introduced into the openings 31 and 32 in the end flanges 27 and 28 of the basket member by deflecting those flanges outwardly, as permitted by the resilience of the material of the basket member.

The assembled fastener elements 19 are introduced into the channel 7 at selected locations where there are the openings 9 in the central web 8 and the openings 14 and 16 in the side flanges 15 and 17 of the channel. This is done, at each location, by appropriately deflecting the side flanges 15 and 17 so that the tabs 35 and 36 can fit within the openings 14 and 16 in the side flanges. The end portion 41 of the tubular element 40, which is of reduced diameter, then extends into the opening 9. A bolt has access to the nut 22 through the opening 9 in the channel 7, and the tubular portion 40 and the opening 42 in the retainer member 21.

The channel 7 may be made to any length desired to accommodate an appropriate number of fastener assemblies 19. The channel 7 may be supplied as a elongated element that is cut to the necessary length by the user.

Considerable floating movement is permitted the nut 22 of the fastener element 19 relative to the channel 7. In part, this comes from the floating movement permitted the retainer 21. This member is narrower than the spacing between the side flanges 15 and 17 of the channel 7, and its tabs 35 and 36 are not as wide as the openings 14 and 16 in the side flanges. Therefore, the retainer can float laterally relative to the channel. The floating movement of the retainer 21 is limited by the reduced diameter end portion 41 of the tubular section 40. The end part 41 of the tubular section fits within the opening 9 with a clearance. The end part 41 will engage the edge of the opening 9 to limit the lateral travel of the retainer 21. The nut 20 also may float laterally relative to the basket 20. This comes about because the baseplate 45 of the nut 22 is shorter in length than the distance between the flanges 27 and 28 of the basket, and the tabs 48 and 49 are of smaller dimension than the openings 31 and 32 in the flanges 27 and 28. The baseplate 45 also is narrower than the spacing between the side flanges 15 and 17. Therefore, the nut 22 has freedom for a great deal of lateral floating movement, which facilitates the entry of a bolt into the nut.

The channel 7 is not adapted for repeated flexing, so that once the tabs 35 and 36 of the attachment member 21 are received in the openings 14 and 16 of the channel this is considered a permanent attachment. However, if the nut 22 should, at some time, become damaged, it may be replaced nevertheless. This is because of the resilient nature of the basket 20. It is a simple task to deflect the end flange 27 or the end flange 28 outwardly and allow one of the tabs 48 and 49 of the nut 22 to be separated from the basket so that the nut may be removed. Installation of a replacement nut is facilitated by the flared upper edges 29 and 30 of the flanges 27 and 28 of the basket.

Therefore, this invention provides the advantage of a composite retainer for a fastener element, compatibility with a structure of composite material, a high degree of lateral floating of a nut, and the ability to repeatedly remove and replace the nut of the assembly.

The foregoing detailed description is to be clearly understood as given by way of illustration and example only, the spirit and scope of this invention being limited solely by the appended claims.

What is claimed is:

1. A fastener unit comprising
 a nut member,
 a retainer,
  said nut member and said retainer including cooperative means for releasably holding said nut member to said retainer, whereby said nut member can be removed from and replaced in said retainer,
 a channel of composite nonmetallic material adapted to be connected to a supporting structure,
 and means for permitting limited lateral floating movement of said nut member relative to said channel,
  said channel having a central web having an opening therethrough adjacent said nut member for permitting access to said nut member and side flanges joined by said central web at least one of which has an opening therethrough, said retainer including a first member seated on said central web of said channel and having an opening therethrough, and a second member seated on said first member, said second member of said retainer including means extending into said opening in said side flange for securing said retainer to said channel.

2. A device as recited in claim 1 in which each of said side flanges includes an opening therethrough, said extending means of said retainer extending into each of said openings in said side flanges.

3. A device as recited in claim 1 in which said retainer includes a tubular portion extending into said opening in said central web of said channel, there being a clearance around said tubular portion at said opening in said central web of said channel, whereby said retainer is capable of lateral floating movement relative to said channel.

4. A device as recited in claim 3 with said second member including said tubular portion extending through said opening in said first member and into said opening in said central web of said channel.

5. A device as recited in claim 4 in which said tubular portion has a portion of a first outside diameter received with a relatively close fit within said opening in said first member, said tubular portion including a second and smaller outer diameter at the distal end thereof received in said opening in said central web of said channel.

6. A device as recited in claim 4 in which said first member includes a flat central portion having said opening through said first member, and an upstanding flange at either end of said flat central portion, each of said upstanding flanges having an opening therethrough, said nut member including a threaded portion and a base portion, said base portion overlying said flat central portion, said base portion being shorter than the distance between said upstanding flanges, said base portion including tabs extending into said openings in said upstanding flanges thus defining said cooperative means, said tabs being smaller than said openings, whereby said nut member has freedom for limited lateral floating movement relative to said first member, said upstanding flanges being resiliently deflectable for permitting said tabs to be separated from said openings in said upstanding flanges and the replacement of said nut.

7. A device as recited in claim 1 in which said nut member and said retainer include cooperative means for permitting limited lateral floating movement of said nut member relative to said retainer.

8. A device as recited in claim 1 in which said retainer includes opposite flanges each of which has an opening therein, said nut member including tab means extending into said openings in said opposite flanges for thereby holding said nut member to said retainer and thus defining said cooperative means, said opposite flanges being deflectable for allowing separation of said tab means from said openings in said opposite flanges, whereby said nut member can be released from said retainer.

9. A device as recited in claim 1 in which said channel includes a plurality of said openings in said central web thereof, and including a plurality of said nut members and said retainers associated with said channel, thereby to provide a plurality of fasteners on said channel.

10. A fastener unit comprising
a channel of nonmetallic composite material having a opposite side flanges joined by a central web,
said central web having at one opening therethrough,
each of said side flanges having an opening therethrough adjacent said opening in said central web, and
a fastener assembly, said fastener assembly including
a first member received in said channel, said first member including a first portion on said central web having an opening therethrough adjacent said opening in said central web and having opposite end walls,
each of said opposite end walls having an opening therethrough,
a second member including a first portion overlying said first portion of said first member, and
a tubular portion projecting from said first portion of said second member into said opening in said first portion of said first member, and therebeyond into said opening in said central web,
said tubular portion at said opening in said central web being of smaller lateral dimension than that of said opening in said central web, whereby said second member is movable laterally relative to said channel,
said second member including tab means extending from said first portion thereof into said openings in said side flanges of said channel for retaining said first and second members to said channel, and
a nut member having a threaded portion and a base portion,
said base portion overlying said first portion of said second member and including oppositely projecting tabs received in said openings in said end walls of said first member, said base portion being of smaller lateral dimension than the distance between said side flanges of said channel and of smaller lateral dimension than the distance between said end walls of said first member, and said tab means of said nut member being of smaller lateral dimension than said openings in said end walls of said first member, whereby said nut member is capable of limited lateral floating movement relative to said first member and to said channel,
said end walls of said first member being resiliently deflectable, whereby said tabs of said nut member can be removed from said openings in said end walls for permitting removal and replacement of said nut member.

11. In combination with a structure of nonmetallic composite material having at least one opening therethrough, a fastener unit comprising
a channel of nonmetallic composite material having opposite side flanges joined by a central web,
an adhesive securing said central web to said structure,
said central web having at least one opening therethrough aligned with said opening in said structure, each of said side flanges having an opening therethrough adjacent said opening in said central web, and
a fastener assembly including
a first member received in said channel, said first member including a first portion on said central web having an opening therethrough adjacent said opening in said central web and having opposite end walls,
each of said opposite end walls having an opening therethrough,
a second member including a first portion overlying said first portion of said first member,
a tubular portion projecting from said first portion of said second member into said opening in said first portion of said first member, and therebeyond into said opening in said central web, said first and second members being narrower than the distance between said side flanges, said tubular portion at said opening in said central web being of smaller lateral dimension than that of said opening in said central web, whereby said first and second members are movable laterally a limited distance relative to said channel, said second member including tab means extending from said first portion thereof into said openings in said side flanges of said channel for retaining said first and second members to said channel, and a nut member having a threaded portion and a base portion, said base portion overlying said first portion of said second member and including oppositely projecting tabs received in said openings in said end walls of said first member, said base portion being of smaller lateral dimension than the distance between said side flanges of said channel and of smaller lateral dimension than the distance between said end walls of said first member, and said tab means of said nut member being of smaller lateral dimension than said openings in said end walls of said first member, whereby said nut member is capable of limited lateral floating movement relative to said first member and to said channel, said end walls of said first member being resiliently deflectable, whereby said tabs of said nut member can be removed from said openings in said end walls for permitting removal and replacement of said nut member from said fastener assembly without removal of said first member from said channel.

* * * * *

UNITED STATES PATENT AND TRADEMARK OFFICE
CERTIFICATE OF CORRECTION

PATENT NO. : 4,895,484

DATED : January 23, 1990

INVENTOR(S) : James G. Wilcox

It is certified that error appears in the above-identified patent and that said Letters Patent is hereby corrected as shown below:

In column 3, line 63, "a" should be "an".

In column 5, line 61, after "having", delete "a".

In column 5, line 63, between "at" and "one", insert --least--.

Signed and Sealed this

Thirteenth Day of August, 1991

Attest:

HARRY F. MANBECK, JR.

Attesting Officer

Commissioner of Patents and Trademarks